United States Patent [19]

Fleisher et al.

[11] Patent Number: 5,769,257

[45] Date of Patent: Jun. 23, 1998

[54] METHOD AND APPARATUS FOR MINIMIZING BLAST DAMAGE CAUSED BY AN EXPLOSION IN AIRCRAFT CARGO BAY

[75] Inventors: Howard J. Fleisher, Galloway, N.J.; Edward M. Weinstein, Völs, Austria

[73] Assignee: Galaxy Scientific Corporation, Egg Harbor Township, N.J.

[21] Appl. No.: 583,470

[22] Filed: Jan. 5, 1996

Related U.S. Application Data

[63] Continuation-in-part of Ser. No. 238,232, May 4, 1994, abandoned.

[51] Int. Cl.⁶ ............................ B65D 88/14; B65D 90/08; B65D 90/32
[52] U.S. Cl. ............................ 220/1.5; 109/1 R; 109/79; 220/668; 220/683; 220/692
[58] Field of Search ................................ 220/88.1, 89.1, 220/1.5, 4.29, 4.34, 4.33, 616, 622, 668, 688, 692, 683, 6, 693; 244/118.1, 129.1; 109/78, 79, 49.5, 1 R, 1 S, 1 V

[56] References Cited

U.S. PATENT DOCUMENTS

| | | |
|---|---|---|
| 2,167,525 | 7/1939 | Rosendale ............................ 220/668 X |
| 3,306,487 | 2/1967 | Gregoire ............................... 220/1.5 |
| 4,098,424 | 7/1978 | Liebscher et al. .................. 220/4.34 X |
| 4,828,132 | 5/1989 | Francis, Jr. et al. ...................... 220/6 |
| 4,936,477 | 6/1990 | King et al. ............................. 220/1.5 |
| 5,052,569 | 10/1991 | Cooper ............................... 220/692 X |
| 5,109,998 | 5/1992 | Bretschneider .......................... 220/1.5 |
| 5,267,665 | 12/1993 | Sanai et al. ............................ 220/88.1 |
| 5,360,129 | 11/1994 | Lee ........................................ 220/1.5 |

FOREIGN PATENT DOCUMENTS

| | | | |
|---|---|---|---|
| 2461046 | 12/1974 | Germany ................................. 220/1.5 |

Primary Examiner—Allan N. Shoap
Assistant Examiner—Niki M. Kopsidas
Attorney, Agent, or Firm—Trexler, Bushnell, Giangiorgi & Blackstone, Ltd.

[57] ABSTRACT

Method and apparatus for minimizing blast damage caused by an explosive device carried in luggage or other cargo loaded on an aircraft. A first cargo container is provided which includes a non-explosion-resistant panel. A second cargo container, also including a non-explosion-resistant panel is paired with the first container and both containers are loaded in the cargo bay such that the non-explosion-resistant panels face inboard, oppose and align with one another. The method provides a controlled venting feature whereby explosive products are vented into the adjacent container in the cargo bay of an aircraft through non-explosion-resistant panel on the inboard side of the container. The container is constructed of lightweight, high-strength materials and may be joined to a supporting structure with threaded fasteners, allowing for efficient replacement of damaged panels. The container may also incorporate edge and corner joint designs that exceed panel strength and will not fail under reasonable probable blast pressures, yet require no special manufacturing or maintenance techniques.

7 Claims, 4 Drawing Sheets

METHOD AND APPARATUS FOR MINIMIZING BLAST DAMAGE CAUSED BY AN EXPLOSION IN AIRCRAFT CARGO BAY

This is a continuation-in-part of Application Ser. No. 08/238,232, filed on May 4, 1994 now abandoned.

BACKGROUND OF THE INVENTION

This invention pertains to a method of loading the cargo bay of an aircraft and to a blast-resistant cargo container used in conjunction therewith. The method and container apparatus minimize the probability of a catastrophic failure and crash due to an in-flight explosion in luggage or other cargo carried on the aircraft.

During the past nine years, over 1000 lives and hundreds of millions of dollars have been lost as a result of terrorist bombings of commercial aircraft. Recent actions by the U.S. government (e.g., formation of the President's Commission on Aviation Security and Terrorism; passage of the Aviation Security Improvement Act of 1990) have led to intensified research into methods of increasing the blast resistance of aircraft to small, undetectable amounts of explosives. While explosives detection systems are constantly being improved, the fact remains that there is still a large safety gap between the amount of explosives that can be placed in luggage or cargo without detection and what the aircraft can withstand before failure and loss of life occurs. There is therefore an urgent need to develop an efficient means of containing blast damage caused by undetectable explosive devices carried in cargo.

There are three primary damaging mechanisms that are produced during an explosion: the high magnitude short duration shock wave; the lower magnitude, longer duration quasi-static pressure (QSP); and fragment impact. In an ideal pressure-time history, the initial phase of a blast is called the diffraction phase and is characterized by a high magnitude pressure "spike" over a short period of time. In normal experience, this phase of the blast consists of the initial pressure or shock wave, which is followed by smaller magnitude waves caused by reflections arising from objects in the explosive environment. The shock wave can have magnitudes on the order of 100,000 pounds per square inch (psi), but the duration is on the order of 0.1 milliseconds (ms). As time after detonation increases, the pressure falls off through a transition phase and as the reflections from the shock waves begin to dampen out a longer duration confined gas or quasi-static pressure (QSP) develops. The QSP is several orders of magnitude smaller than the shock pressures—on the order of 100 psi—but can have a duration of 30 ms or more. Finally, the explosion generates accelerated fragments of surrounding materials. The threats posed by all of these mechanisms are minimized by the present invention.

Hardening of cargo containers can only be understood in the context of the range of charge sizes against which the unit is expected to protect. Clearly, for any viable container design, a charge large enough to cause catastrophic damage of the container and surrounding structure could be placed. Therefore, in this, and all work dealing with blast resistant designs, a maximum charge size is identified as the largest charge against which the container is expected to protect. Terms such as "Blast resistant" denote items able to withstand the blast of a charge of the maximum design size. Terms such as "Frangible" or "Non-blast-resistant" denote items strong enough to withstand normal handling but which will fail or yield easily to the forces and other effects of the blast of a charge of the maximum design size.

In transport aircraft, passenger luggage is normally stored in cargo containers, which, in turn, are placed in the cargo bay of the aircraft, located in the lower half of the fuselage. The current generation of cargo containers are comprised of conventional materials such as aluminum, polycarbonate, and fiberglass. Cargo containers made of these materials are woefully inadequate in terms of blast resistance.

There are several methods by which the blast resistance in cargo containers may be increased. One method assumes complete containment of the blast as the objective, which can be achieved using stronger, thicker materials to construct the container. While this is technically possible, the associated cost in terms of container weight and unit price makes this approach impractical.

More practical approaches include methods and containers used to create controlled venting of the explosion to reduce the force of the blast, allowing containers of lesser strength and therefore lighter weight to be employed. There are, however, numerous disadvantages to current methods and container designs attempting to achieve controlled venting. Some of these methods call for venting into all adjacent containers, inboard and outboard, fore and aft. This necessitates the construction of special containers for different compartment positions, since containers in the front and rear must have hardened sides while containers in the middle must have frangible sides. Some methods incorporate venting devices which call for projectiles or hatches which actually penetrate the fuselage of the aircraft. Other methods require the container to be securely latched and sealed. It is obvious that such methods require special vigilance on the part of ground crew, increasing the cost and complexity of ground operations.

Moreover, methods of controlled venting alone does not solve all problems associated with blast containment. Blast-resistant cargo containers used in controlled venting must still withstand significant shock and pressure forces without failure. Present containers typically fail under blast loading because panels tear through their attaching rivets or the rivets themselves fail in shear. Also, currently-used lightweight panel materials offer little resistance to blast fragments. These problems are overcome in some container designs, but only by using complicated connecting devices as well as expensive and exotic materials and manufacturing processes.

As a result, these approaches carry with them several disadvantages. First, such containers tend to be expensive. This factor alone is a significant deterrent to use. Second, the exotic materials and complicated designs make such containers difficult and expensive to repair, greatly increasing operational expense. Furthermore, such exotic materials typically lack durability, not only in the face of rough day-to-day handling but also when subjected to precipitation or extremes in temperature. Also, the materials used in these containers, in conjunction with their complicated designs, often call for the development and use of special techniques for construction, repair, inspection and maintenance. All of these factors tend to increase cost and down-time to the extent that use of such containers may not be economically feasible.

There is therefore a need for a lightweight, durable and less expensive means for use with an improved method of minimizing blast damage caused by an explosion in aircraft cargo that does not entail high operational costs due to special handling, difficult maintenance and excessive downtime.

SUMMARY AND ADVANTAGES OF THE INVENTION

In general, the present invention comprises a method, and apparatus, for minimizing explosion damage to an aircraft caused by an explosive carried in the cargo bay. The method comprises the steps of providing first and second explosion-resistant containers for storing cargo to be transported by the aircraft; including a non-explosion-resistent panel in each of the cargo containers; maneuvering the containers into the cargo bay; arranging the containers so that the non-explosion resistant panels of each of the containers are aimed in an inboard direction in the cargo bay, and; positioning the containers so that the non-explosion resistant panels substantially face and align with one another. The method may further include loading multiple pairs of first and second explosion-resistant containers and positioning the individual containers which form pairs in close, facing relationship with one another.

The container apparatus comprises a box of substantially rectangular cross-section having a plurality of explosion-resistant panels forming an outboard end, a top, a base and two sides connected by a plurality of edge joints and corner joints. A non-explosion-resistant panel, or simply an aperture, forms the inboard end of the container so as to allow access to the interior of the box and so as to vent an explosion therein through the non-explosion-resistant panel and into the facing container positioned in the cargo bay.

In one embodiment of the container, the explosion-resistant panels are formed with margins having two right-angle bends which mate with cooperating surfaces on a support frame to which the panels are fastened to provide edge and corner joints for the container.

In another embodiment, the margins of the explosion resistant panels are fastened to the leaves of continuous hinge members to form joints for the container. The leaves of the continuous hinge members are joined by a substantially round hinge pin. This arrangement minimizes the resistance of the joints to the rotation of one panel relative to an adjacent one. In the event of a blast, a blast resistant container tends to become spherical. This tends to straighten out the joints. A joint design that resists this motion will result in added stresses to the joints and to the panels. The use of continuous hinges with substantially round hinge pins prevents these added stresses from occurring in these critical regions.

The present invention has several advantages over container designs currently in use. For example, the invention includes a controlled venting feature providing a significant reduction in the force of the QSP, yet the containers do not require any special identification, placement or handling. For an example, the glass-reinforced aluminum laminate of the preferred embodiment is an advanced panel material which features high strength, low density and many of the manufacturing advantages of normal metals. Thus, no special manufacturing techniques need be developed to enjoy the advantages of this invention. The glass-reinforced aluminum laminate of the preferred embodiment also provides greater resistance to fragment impact than conventional materials. In addition, the unique connection between the panel and the frame will not fail until the panel strength is exceeded—and the panels themselves will not fail under any reasonably probable blast pressure. As still another advantage, the interior, exterior and frame surfaces of one embodiment are entirely aluminum, providing a container with a durability comparable to containers currently in use. Also, the unique connecting mechanisms allow easy inspection and replacement of damaged panels, minimizing downtime and operational costs. And since aluminum containers are the most common containers in use, no new or special handling techniques are needed.

These and other advantages of the present invention will become readily apparent from the following description of the preferred embodiments of this invention. This description is provided simply by way of illustration of one of the modes best suited to carry out the invention. As those skilled in the art will realize, the invention is capable of other different embodiments, and its several details are capable of modification in various obvious aspects all without departing from the invention. Accordingly, the drawings and descriptions should be regarded as illustrative and not restrictive.

BRIEF DESCRIPTION OF THE DRAWINGS

The organization and manner of the structure and operation of the invention, together with further objects and advantages thereof, may best be understood by reference to the following description taken in connection with the accompanying drawings, wherein like reference numerals identify like elements in which.

DETAILED DESCRIPTION OF THE PREFERRED EMBODIMENT

Figure 1:
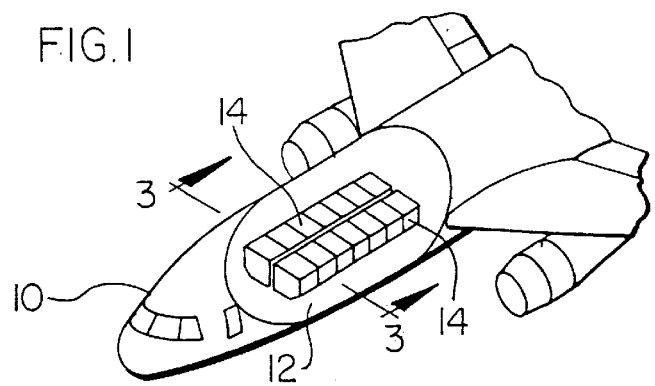
FIG. 1 is a perspective view of a portion of an aircraft illustrating an arrangement of cargo containers loaded into a portion of a cargo bay in accordance with the method of this invention.
Figure 2:
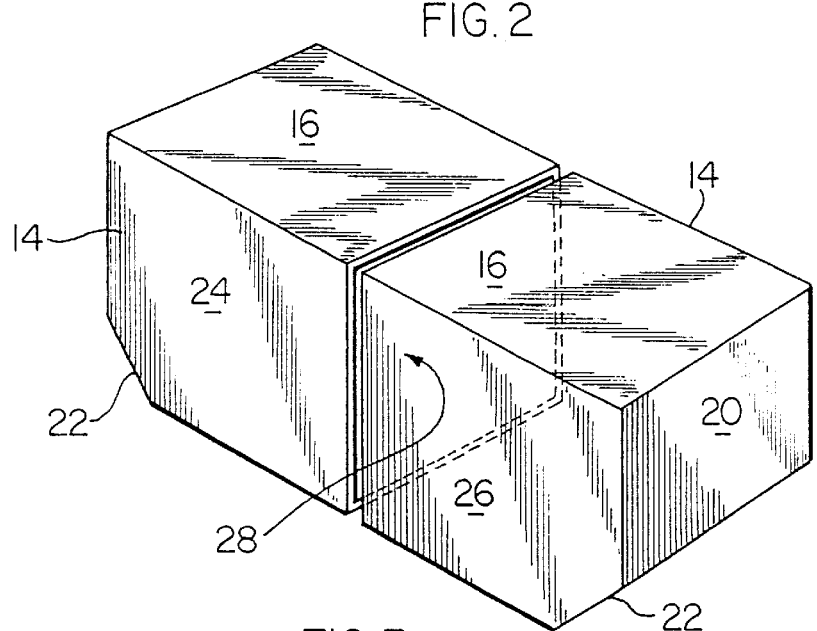
FIG. 2 is an isolated perspective view of a single pair of cargo containers arranged in accordance with the method of this invention.
Figure 3:
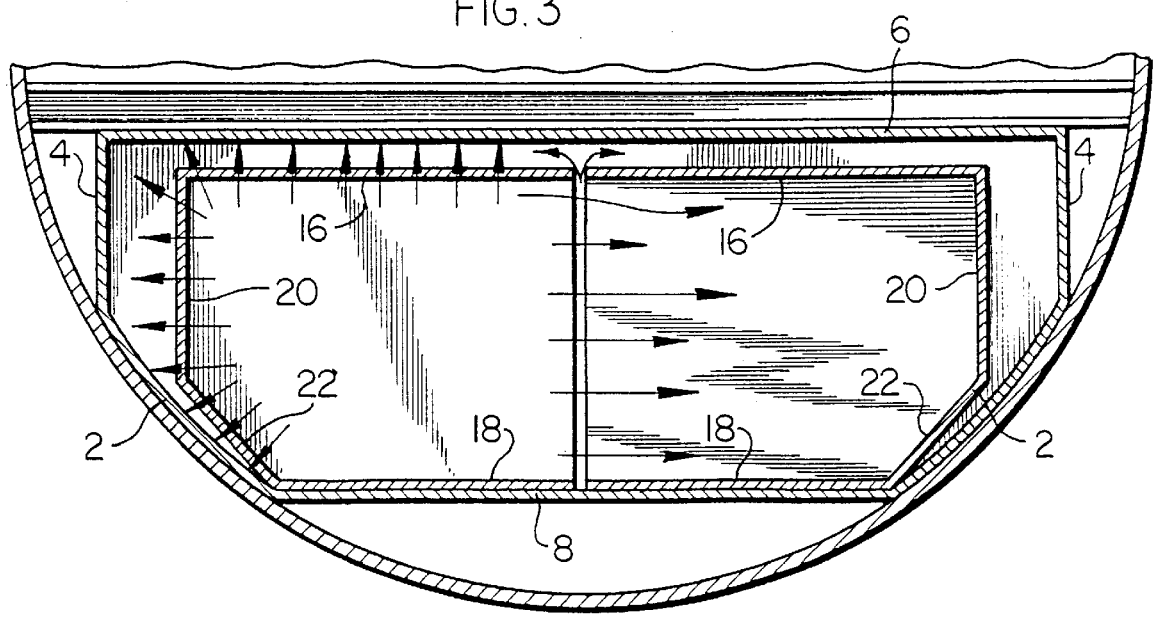
FIG. 3 is an enlarged sectional view taken along the line 3—3 of FIG. 1.

The unique method of this invention is best understood by reference to FIGS. 1–3. In FIG. 1, a portion of the fuselage of an aircraft 10 is shown to include a cargo bay 12 having pairs of cargo containers 14 positioned therein. The cargo containers 14 are used to store passenger luggage, or other cargo, for transport in the aircraft 10.

Upon reference to FIGS. 2 & 3, it can be seen that the containers 14 are composed of a number of flat, rectangular panels. The overall dimensions of the type of container 14 used in typical wide-body transport aircraft is 79 inches long, 64 inches high, and 60 inches wide. The preferred embodiments conform to these dimensions with the panels comprising a top 16, a base 18, an outboard vertical 20, an outboard sloping 22, a right side 24, and, referring to FIG. 2, a left side 26. An inboard end panel 28, or simply an aperture, is disposed in a vertical plane as shown. In the preferred embodiments this aperture 28 is the open inboard end of the container 14 formed by the adjacent panel margins. If an optional door (not shown) on the aperture is used, the door must be lightweight and yield easily when exposed to an explosive blast. For example, a canvas flap door would be suitable for this use. The aperture 28 allows normal access to the interior of the container 14 for loading and unloading, and also serves to vent explosion products through the inboard aperture 28 of the laterally adjacent container 14, and into that container. In practice, these containers 14 will be filled, at least partially, with luggage or other cargo, and maneuvered into the cargo bay 12. The containers 14 will be arranged in pairs, such that the non-explosion-resistant panels or apertures 28 of each of the containers 14 is aimed in an inboard direction of the cargo bay 12. The procedure next requires insuring that the inboard apertures 28 of these containers 14 are positioned to be aligned with one another when they are placed on-board the aircraft. When the cargo bay 12 is full, it is very difficult to position such containers 14 incorrectly. Accordingly, ground crew are not required to give any special consideration to placement other than ensuring that the containers 14 are arranged in face-to-face pairs. This unique door-to-door design provides a controlled venting feature by which the volume of the laterally adjacent container is immediately available in the event of an explosion, cutting the force of the QSP in half. There will also be a limited amount of venting around the edges of the inboard apertures 28 into the cargo bay 12, which is approximately 20 times larger than a single container 14. This limited venting will serve to further reduce the force of the QSP. The force of an explosion occurring in the left-hand container 14 of FIG. 3, and venting thereof, is illustrated with the arrows extending into the right-hand container and up through the spacing between the containers.

The apertures or doors 28 of laterally adjacent containers will be extremely close together, the exact distance dependent upon the specific aircraft in which they are loaded. In the cargo bay 12 of a typical wide-body aircraft, the containers are placed in side-by-side rows in mirror-image alignment extending the length of the cargo bay 12, which is approximately 40 feet. The interior of the cargo bay 12 consists of an aluminum floor 8 on which the containers sit. The ceiling 6, sides 4, and contour 2 of the cargo bay 12 are normally composed of a light fiberglass liner attached to supporting structure. The ceiling 6 is attached to the beams supporting the passenger deck floor.

As indicated in part by the additional arrows in FIG. 3, the container 14 will respond to the initial high intensity short duration shock pressure of an explosion by expanding along the top 16, base 18, outboard vertical 20, outboard sloping 22, and side panels 24, 26. Ideally, the container panels will not deform beyond the clearances provided in the cargo bay 12 of the aircraft. The explosive products will be propelled through the aperture or door 28 and into the laterally adjacent container 14, effectively doubling the container volume and reducing the magnitude of the QSP. The small clearance between laterally adjacent containers and between the container tops 16 and cargo bay roof 16 will provide additional expansion volume and a corresponding reduction in the QSP. The glass-reinforced aluminum laminate panels of the container 14 prevent any significant damage to the aircraft from fragments generated by the explosion.

The containers 14 of the present invention are also lightweight, relatively inexpensive (when compared to other blast mitigation technologies), durable and easy to repair. These advantages are achieved through a unique edge and corner joint designs which (as discussed in greater detail below), although using threaded fasteners for easy removal and installation of panels, will not fail when subjected to any reasonably probable blast pressure. In the preferred embodiments, the container panels are constructed of glass-reinforced aluminum laminate or aramid-reinforced aluminum laminate. These materials have the advantage of being lightweight, yet strong enough to withstand any reasonably probable blast pressure while containing blast fragments. Furthermore, these hybrid materials are readily available in the market at competitive prices, and their exterior aluminum surfaces are extremely durable. The utility of the edge and corner joints is not limited to panels constructed of these materials, however, as any lightweight high-strength material may be selected for use in conjunction with the edge joint designs discussed below.

Figure 4:
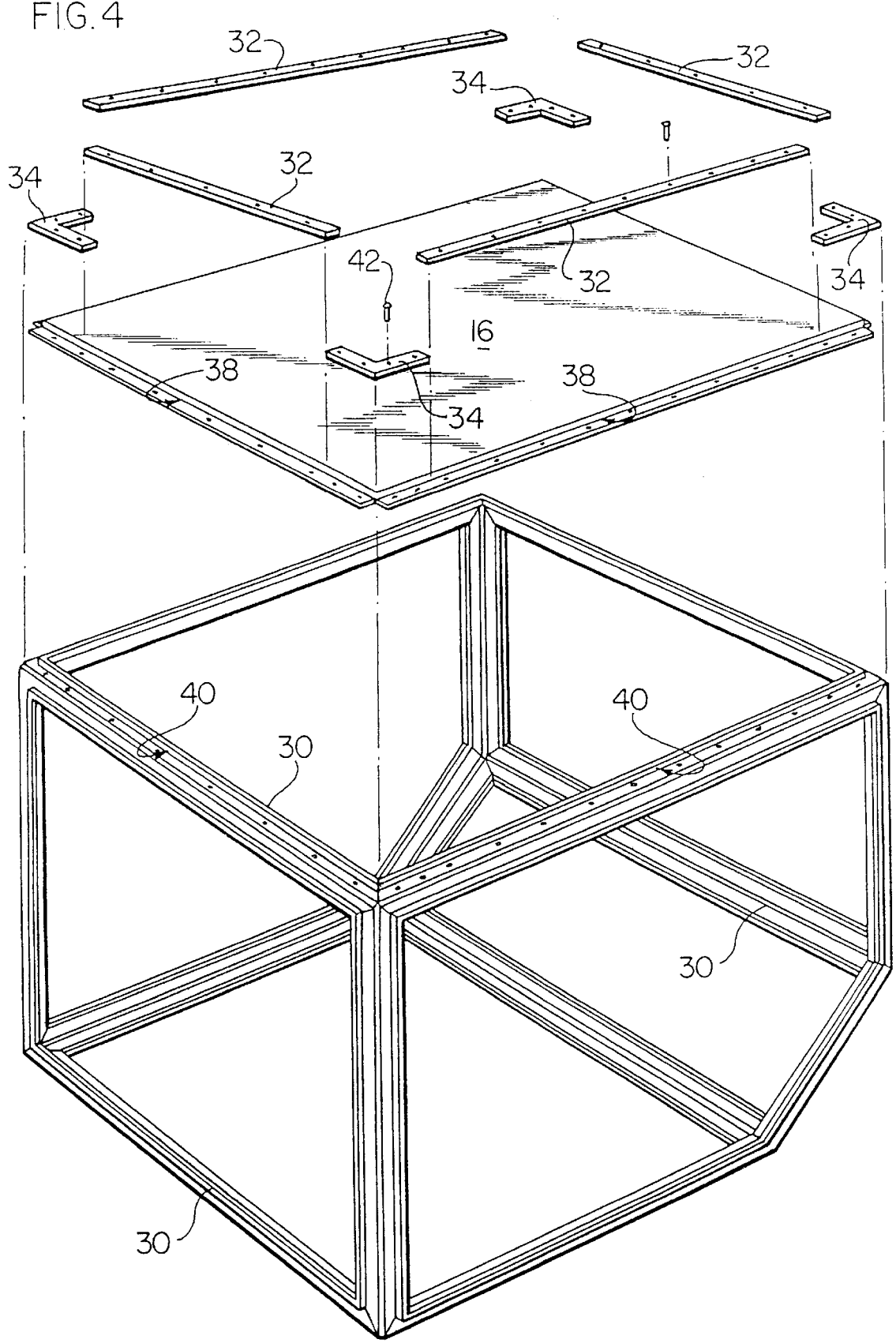
FIG. 4 is a perspective view illustrating the construction of one embodiment of the container, showing the frame member and one panel of the container removed.
Figure 5:
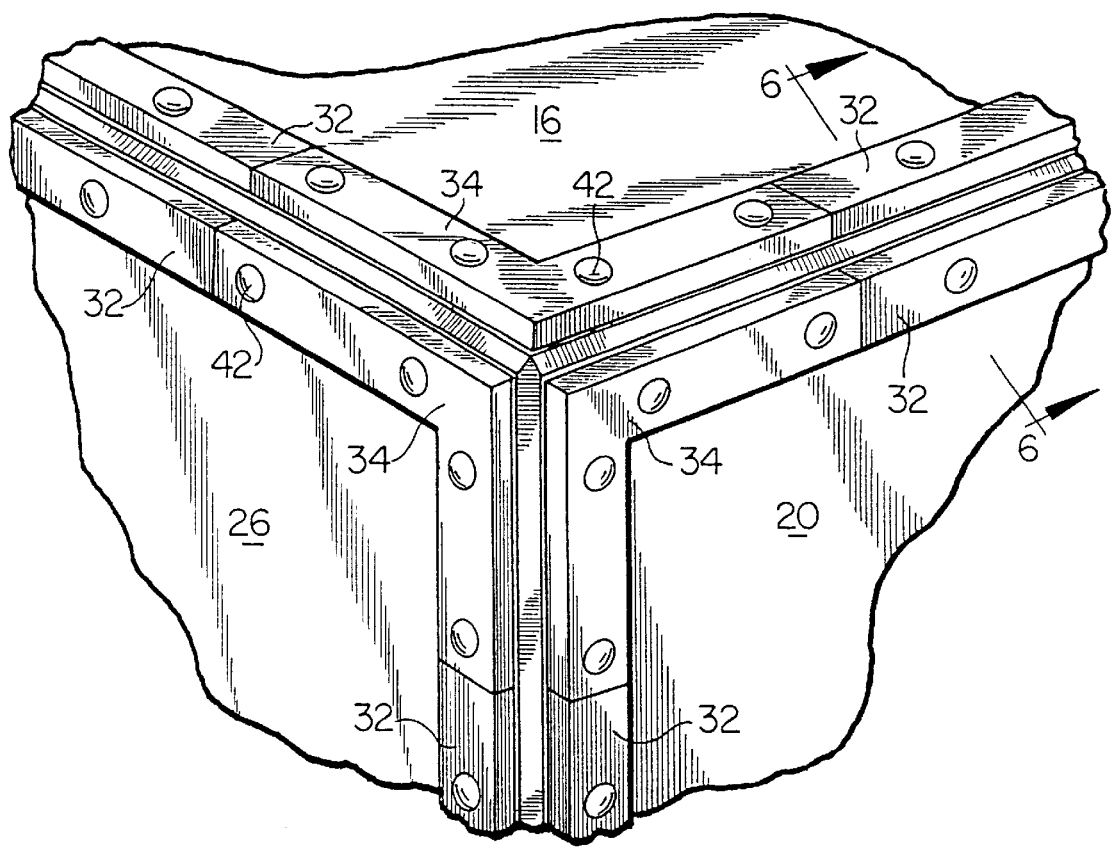
FIG. 5 is a perspective view of a corner of the container embodiment illustrated in FIG. 4.
Figure 6:
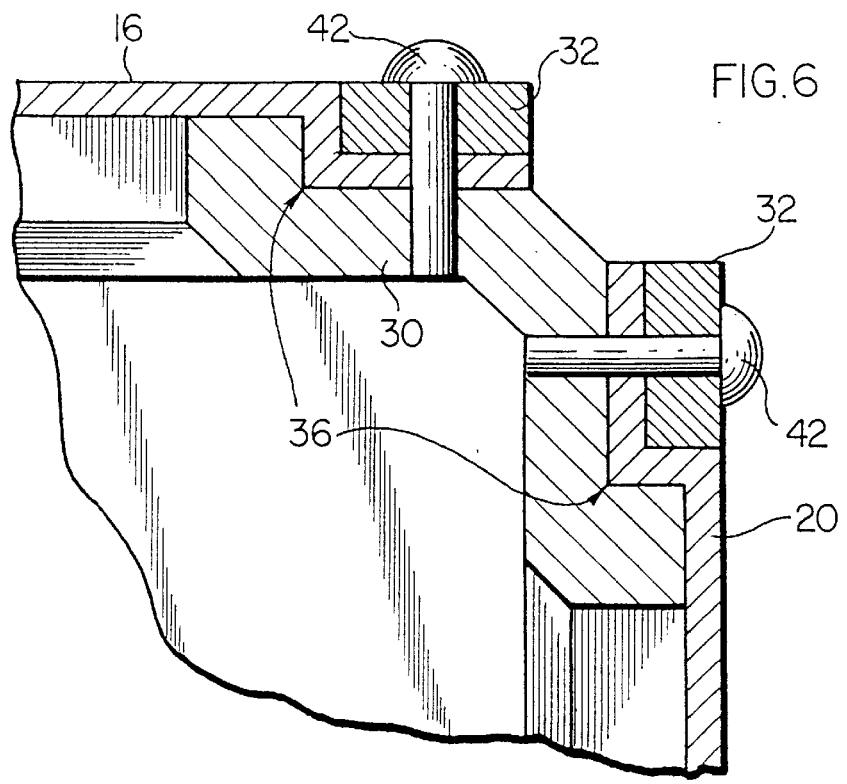
FIG. 6 is a sectional view taken along line 6—6 of FIG. 5.

Two separate edge and corner joint designs for the containers 14 will now be discussed. In one embodiment, as illustrated in FIGS. 4–6, the panels of the containers 14 are formed with two right-angle bends on their margins to provide marginal steps. In practice, these bends are radiused to a specific dimension to alleviate stress concentrations. The interior surface of the marginal steps on the panels fits into mated receiving steps on an aluminum frame member 30. A tie-down block 32 of rectangular cross section formed from a lightweight, high-strength material is placed against the exterior surfaces of each marginal step on the panels and all three pieces are then secured with threaded fasteners 42. This tie-down block 32 runs almost the entire length of each marginal step. In the illustrated embodiment, the tie-down block 32 is made of aluminum, but those skilled in the art will appreciate that many other materials would be suitable for this purpose. The frame 30 cooperates with the marginal steps, secured against the mated receiving step on the frame, to create an interference in the direction of tension forces. During an explosion, each panel resists the blast by an outward deformation and membrane tension. This tension will pull the marginal step of the panel towards the step on the frame where there is an interference. Thus, the invention will not fail until the threaded fasteners fail or until the marginal step of one of the panels pulls out from between the frame 30 and the tie-down block 32. The use of preloaded graded fasteners increases the join pullout strength beyond panel strength.

The aluminum frame is mitered at a predetermined angle so as to form flush corners. The corner joints are secured by placing corner brackets 34, of the same cross-sectional dimensions as the tie-down blocks 32, on the corner of each panel meeting at a corner of the container 14. This corner bracket 34 abuts the two perpendicular tie-down blocks 32 converging on the corner and forms a flush joint with them. In practice, either two or three panels will meet at a corner of the container, and corner brackets 34 are placed on each of these panels.

More specifically, each of the panels 16, 18, 20, 22, 24 & 26 are formed with margins having two right-angle bends to provide interior 36 (FIG. 6) and exterior 38 step surfaces. FIG. 4 shows only the top panel 16 for clarity of illustration. The aluminum frame member 30 is provided with mating receiving steps 40 formed on each of the exterior surfaces of the frame components. The right-angle bends are radiused to a specific dimension to alleviate stress concentrations. The interior step surfaces 36 of the panels fit into the mated receiving steps 40 on the aluminum frame member. The tie-down blocks 32 of rectangular cross-section, running nearly the length of the panels, fit into the margin provided with the exterior step surface 38 of the panels. Fasteners 42 are then used to connect the tie-down blocks 32, the panels 16, 18, 20, 22, 24 & 26, and the frame member 30. The fasteners 42 are located at substantially constant spacing along the length of the panel, only a single line of which along one margin are shown in the drawings. Multiple lines of fasteners could also be used along the margins if so desired.

In prior art designs, where the panel/frame connection consists of a flat panel simply bolted or riveted to the frame, the joint strength is limited by the lesser of the shear strength of the fastener and the pullout strength of the panel. The embodiment of the invention illustrated in FIGS. 4–6 provides an edge joint that exceeds the panel strength through the incorporation of step surfaces on the panels and the inclusion of tie-down blocks 32. After an explosion in the container 14, resistance to the load produced by tension in the panels is provided by an interference in the direction of tension between the panel/block assembly and the frame member. The invention will not fail until the fastener 42 has failed, or a panel has pulled out from between the block 32 and frame member 30. Use of graded fasteners 42 will prevent the former failure. Preloading the graded fasteners 42 will increase the friction between the panels and both the block 32 and frame 30 to the extent that joint pullout strength exceeds panel strength.

Additionally, the invention lends itself to efficient panel replacement since the panels are easily removable from and attachable to the frame 30 by simple removal and reinsertion of the fasteners 42.

Figure 7:
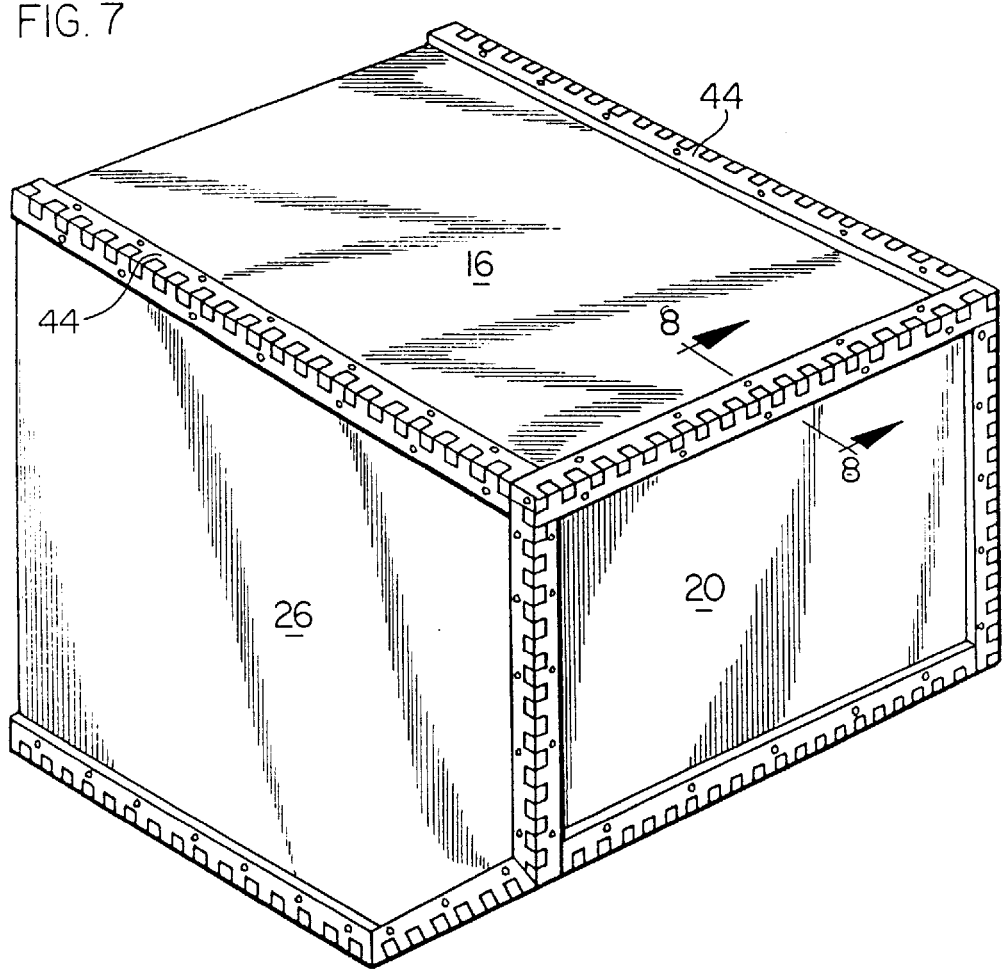
FIG. 7 is a perspective view illustrating the construction of another embodiment of the container in accordance with this invention.
Figure 8:
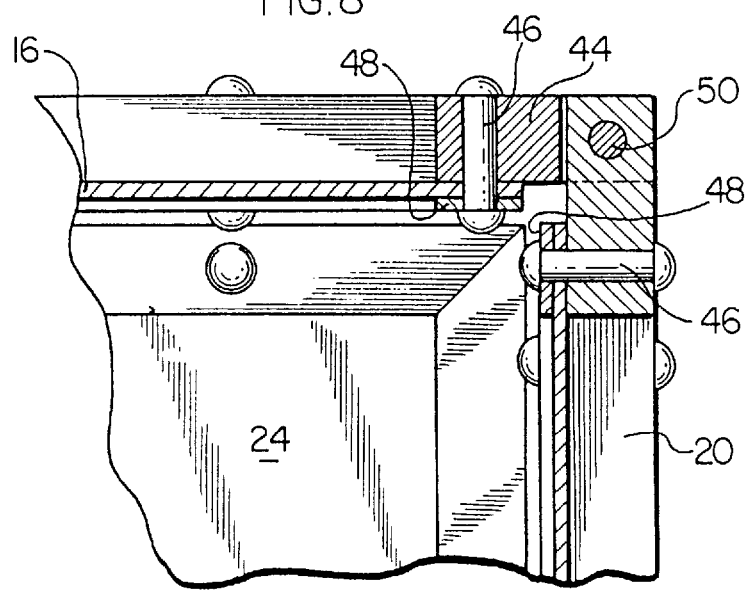
FIG. 8 is a sectional view taken along line 8—8 of FIG. 7.

A second embodiment of the edge and corner joint design for the containers 14 is as illustrated in FIGS. 7 and 8. For this embodiment, the panels of the containers 14 are cut to a desired shape and to a size scaled down slightly from the desired finished container size. For each pair of panels to be joined along an edge, one leaf of a continuous hinge 44 is fastened along the edge of one face of each of two adjoining panels. This fastening can be accomplished by either a chemical bond, mechanical fasteners such as screws, bolts or rivets 46 as shown, or a combination of both. Furthermore, this fastening may also include a strip of metal 48 (FIG. 8), or doubler, of roughly the same width as the hinge leaf, bonded to the side of the panel opposite the hinge leaf. Any mechanical fasteners would tie all three items, the hinge 44, the panel (16, for example), and the backing strip 48 together. In this manner, each of the panels is fastened to each of the adjacent panels in the completed container 14. In the illustrated embodiment, the hinges are made from extruded aluminum with a hinge pin 50 (FIG. 8) of drill rod steel, the backing strip 48 is made from plate aluminum, and the hinge 44 and the backing strip 48 are fastened to the panel with a combination of aluminum rivets 46 and epoxy (not shown). However, those skilled in the art will appreciate that many other materials and fastening techniques would be suitable for this purpose. Again, multiple rows of fasteners could also be used if desired. The hinge pin 50 will be captivated in the hinge in such a way that it is not easily removed with ordinary tools, but can be readily removed either with specialty tools or by cutting or drilling either of the two hinge leafs. As is shown in FIG. 8, the hinge pin 50 will be of substantially round cross section so that the two leaves of the hinge, when joined, will rotate freely with respect to each other. An example of such a captivation technique is the use of keyed set screws. By removing the hinge pin 50, the container 14 can be completely or partially disassembled for easy panel replacement. During an explosion, each panel resists by an outward deformation and membrane tension. The use of hinges at each edge ensures that the membrane tension will be resisted by shear in the chemical bonds and the mechanical fasteners. Should the chemical bond, if there is one, fail, the mechanical fasteners will continue to resist the membrane tension until the load is removed, the fasteners fail in shear, or the fasteners pull through the panel. The fasteners 46 are placed at an even interval along the length of the edge and are inserted perpendicularly through the hinge leaf 44, the panels, and the backing strip 48. The holes for the fasteners 46 can be either tapped or clearance holes. The fasteners 46 can be threaded fasteners with tapped holes, threaded fasteners with nuts, or high strength rivets.

As noted above, in prior art designs, where the panel/frame connection consists of a flat panel simply bolted or riveted to a frame, the joint strength is limited by the lesser of the shear strength of the fastener, the head strength of the fastener, and the pullout strength of the panel. Because the panels are fastened to a rigid frame, and because the blast loading on the panels tends to bow them outward, the panels tend to peel off the frame. This adds a tensile load to the fasteners causing them to fail sooner. It also makes the use of chemical bonds impractical, as such bonds have limited ability to resist peel. The embodiment of the invention illustrated in FIGS. 7 and 8 provides an edge joint that exceeds the panel strength through the incorporation of a continuous hinged frame and either high strength fasteners, high strength chemical bonding, or both. Because the panels are joined through a hinge 44, it is not possible that they will experience any loading that will tend to peal them off of the hinge leafs. The chemical bond alone provides a joint strength in excess of the panel strength. The high strength fasteners 46 used in this embodiment are many times stronger than those used in current designs preventing container failures due to the failure of fasteners. Furthermore, in the preferred embodiment, these fasteners will only be loaded in the event of the failure of the chemical bond. In this case, the use of the backing plate 48 will greatly increase the pullout strength of the material and will also provide friction resistance to the failure of the joint.

In sum, the advantages of the invention are significant. Utilization of the method described results in controlled venting and greatly reduces the loads generated by an explosion. This minimizes the potential damage to the more crucial aircraft structure and systems. The invention also takes advantage of the substantial energy absorption capacity of the luggage within the container.

In prior art designs, the containers fail because the panels tear through the rivets or the rivets themselves fail in shear before the limit of panel strength is approached. The present invention embodiments for the containers allow the fill strength of the panels to be utilized, yet the unique panel/frame connections allow for easy panel replacement The glass-reinforced aluminum laminate panel material provides a substantial increase in strength coupled with a reduction in weight, enabling the invention to have a low tare weight, well within the acceptable range for currently used containers. In addition, since this material consists primarily of aluminum, it can be attached and inspected as aluminum, eliminating the need for new manufacturing processes or damage inspection techniques.

The invention is also quite flexible, as there are a number of possible door attachments, if any, that can be used in conjunction with the preferred embodiments. While the invention was shown for only one particular set of dimensions, it is not so limited, and is amenable to various changes without departing from the scope of the invention.

The invention is claimed as follows:

1. A method of loading a cargo bay of an aircraft fuselage in order to minimize the blast damage of an explosion, said cargo bay extending along a predetermined length within the aircraft fuselage and having a width which is bounded by opposite side walls of the fuselage, said method comprising the steps of: providing a first explosion-resistant container including a plurality of high-strength, light-weight panels for resisting a blast of a maximum anticipated magnitude, and a substantially non-explosion-resistant panel which cannot resist a blast of a maximum anticipated magnitude; providing a second explosion-resistant container also including a plurality of high-strength, light-weight panels for resisting a blast of a maximum anticipated magnitude, and a substantially non-explosion-resistant panel which cannot resist a blast of a maximum anticipated magnitude; storing cargo to be transported in at least one of said containers; maneuvering the first and second containers into the cargo bay; arranging the first and second containers in pairs such that the non-explosion-resistant panel of each of the containers is aimed away from the fuselage side wall to which the container is nearest, in a substantially perpendicular direction toward the opposite fuselage side wall across the cargo bay, and; positioning the first and second containers such that the non-explosion-resistant panel of each of the first and second containers are substantially facing and aligned with one another.

2. The method as recited in claim 1, wherein the method of loading the cargo bay further comprises the step of loading one or more additional pairs of containers into the cargo bay.

3. The method as recited in claim 1, wherein said non-explosion-resistant panels are positioned within very close proximity with one another.

4. The method as recited in claim 1, wherein the non-explosion-resistant panels of the first and second containers comprise open end apertures.

5. The method as recited in claim 1, wherein the explosion-resistant containers comprise a series of panels, at least one of which is formed with a margin having two right-angle bends which mate with a cooperating surface on a support frame to which the series of panels are joined.

6. The method as recited in claim 5, wherein each of said explosion-resistant panels comprises said margins having two right-angle bends which mate with cooperating surfaces on a support frame to which the panels are fastened.

7. The method as recited in claim 1, wherein the explosion-resistant containers are formed from a series of panels, the margins of at least two of which are fastened together by a continuous hinge.

* * * * *